July 20, 1943. E. ÖMAN 2,324,869
APPARATUS FOR SEPARATING SOLUTION FROM A
MIXTURE OF SOLUTION AND ICE CRYSTALS
Filed Jan. 9, 1939
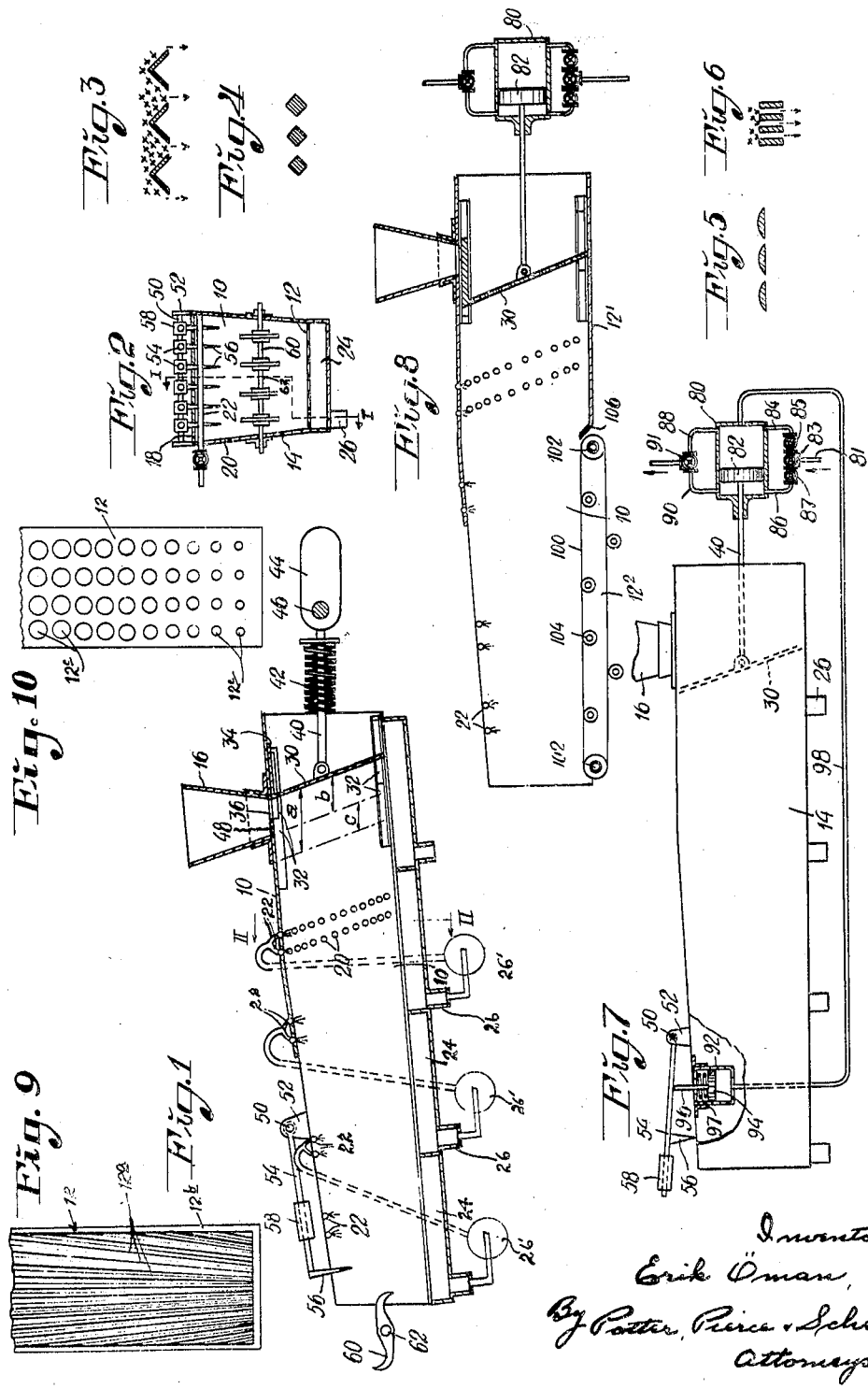

Patented July 20, 1943

2,324,869

UNITED STATES PATENT OFFICE 2,324,869

APPARATUS FOR SEPARATING SOLUTION FROM A MIXTURE OF SOLUTION AND ICE CRYSTALS

Erik Öman, Stocksund, Sweden

Application January 9, 1939, Serial No. 250,023
In Sweden January 14, 1938

2 Claims. (Cl. 100—50)

The present invention pertains to a method of and an apparatus for the separation of solution from a mixture of solution and ice or snow crystals formed by freezing water out of a solution of a substance in water. In such freezing out, the mixture of solution and ice or snow crystals is obtained in the form of an ice sludge, and the object of the invention is to separate the concentrated solution from the ice or snow crystals in an efficient and cheap manner, without the solution's becoming diluted to any appreciable extent.

The method according to the invention is essentially characterized by the fact that the mixture in the form of a continuous column or bar is compressed through the influence of an intermittently applied pressure so as to be positively advanced and washed during its advance, the escaping liquid being removed and the ice column or bar being intermittently supplemented by the supply of portions of further quantities of mixture. As washing liquid one uses a solution of a concentration varying between the concentration of the mother liquor accompanying the crystals and pure water. The washing may be effected with a solution of a different concentration at different points in the longitudinal direction of the ice bar. The bar is advanced intermittently and during its advance it is subjected to a compression in order to obtain a rapid separation of solution. During this intermittent advance the bar is supplemented by the supply of portions of further quantities of ice sludge. To facilitate the separation of the solution, such separation may be effected through suction.

The device for carrying the above described method into effect comprises a channel with a perforated bottom and having a device for the supply of mixture at one end thereof, the intake end which is provided with a roof; and also a member, e. g. a transverse piston adapted to close the channel, said member being displaceable to and fro in the longitudinal direction of the channel, means for supplying the washing liquid, for instance spray nozzles, being provided in the upper part of the channel. The ice sludge is thus supplied at one end of the channel, the ice, relieved of solution entirely or in part, then escaping at the other end of the channel. Preferably the perforations in the bottom of the channel have a smaller area of passage at the intake end of the channel than along the main portion thereof. To facilitate the separation of solution, one or both of the longitudinal sides of the channel may also be perforated.

The invention will be described more closely with reference to the accompanying drawing, which by way of example illustrates apparatus for carrying the invention into effect, and in connection with which other features characteristic of the invention will also be set forth.

Fig. 1 is a longitudinal section, on the line I—I of Fig. 2, through one embodiment of an apparatus according to the invention. Fig. 2 is a section on line II—II in Fig. 1. Figs. 3, 4, 5 and 6 represent sections of different embodiments of bottom ribs. Fig. 7 is an elevation, partly in section, of another embodiment, Fig. 8 represents a modified arrangement for carrying the method according to the invention into effect, Fig. 9 is a plan view of one form of bottom for supporting the ice bar in the channel, and Fig. 10 is a plan view of a modified form thereof.

According to Figs. 1 and 2 the apparatus consists of a channel 10 of approximately rectangular cross section, with horizontal or substantially horizontal perforated bottom 12 and side walls 14. In the intake end of the channel there is provided a supply means for ice sludge in the form of a hopper 16. From the intake end of the channel, the latter may first have a constant cross section which then diminishes in the vertical direction. The channel is provided with a roof 18, at least for a portion of its length from the charging end.

The ice sludge is advanced through the channel by means of any suitable contrivance, solution then escaping through the perforations in the bottom of the channel, which perforations may consist of openings of various kinds. To facilitate the separation of solution, perforations may also be arranged in the sides of the channel, at least at the intake end thereof, as shown at 20. According as solution is being separated out of the ice sludge, the latter is caused to form an ice bar of ever increasing rigidity, which ice bar is being advanced along the bottom of the channel. The bottom perforations may have a smaller passage area at the intake end, where the ice sludge is still comparatively loose, than along the main portion of the channel, and the size of the perforations may vary according to the size of the ice crystals, the viscosity of the solution and other factors.

To lessen the friction of the ice bar against the bottom 12, and thus to facilitate the conveyance thereof through the channel, the bottom 12 is preferably formed of bars or ribs of some suitable material, for instance wood or metal, such as iron or brass, said bars being arranged parallel to each other in the longitudinal direction of the channel, with intervening spaces therebetween. The size of the spaces may vary for instance from 1 to 15 mm., preferably from 2 to 6 mm. Generally, comparatively small ice crystals will be obtained from such solutions that have been obtained by the freezing out of concentrated solutions, and these ice crystals have a tendency to pass, together with the solution, through the intervening spaces in the form of a sirup-like mass. To prevent this, it will be found suitable to use bars of such a cross section and arranged in the channel in such a manner that the ice crystals will be retained between the ribs or bars by a wedging effect, as shown in Figs. 3 and 6, whereby it will be found possible to increase the size of the spaces between the bars or ribs. This wedging of the ice crystals may be brought about, for example, by choosing the cross section of the bars and by arranging the latter in the channel in a manner such that they will form spaces with a comparatively great vertical extension or with a ridge projecting inwardly into the channel, said ridge having laterally sloping sides. Various embodiments of such ribs are represented in Figs. 3 to 6. According to Fig. 3, the ribs consist of angle-irons arranged with the ridge thereof directed upwardly, while according to Fig. 4 these ribs are of square cross-section, positioned in an edgewise fashion. According to Fig. 5, the ribs are composed of members having a semi-elliptical cross section, and, according to Fig. 6, the ribs consist of members having a rectangular cross section, which are likewise positioned edgewise. In order to provide a narrower spacing between the bars adjacent the intake end, the bars 12a are mounted in a frame 12b in divergent relation as shown in Fig. 9. If desired a plane bottom provided with perforations 12c increasing in size in the direction of travel, as shown in Fig. 10, may be used.

For the washing of the ice bar, spraying pipes 22 for washing liquid are arranged in the upper portion of the channel, which washing liquid may consist of a solution of a concentration equal to that of the mother-liquor accompanying the crystals, of a solution of a lower concentration, or of water, or of two or more liquids of this kind. As will be seen from the drawing, these spraying pipes are in the closed portion of the channel arranged at the roof of the channel, whereas in the open portion of the latter they are secured to the side walls 14 (see Fig. 2). Arranged underneath the bottom 12 of the channel is a collecting box 24 for the solution escaping from the ice. To accelerate the removal of the solution, it may be found suitable to make use of a pressure slightly below atmospheric in the box, such as a pressure from 5 to 1000, preferably from 100–300 mm. water column. It will appear from the drawing that the suction box 24 is divided into a number of compartments, each of which has an outlet 26. Preferably the wash liquid for the ice bar is supplied for passage transversely therethrough a number of times in steps progressing countercurrently to the direction of travel of the bar through the channel. For instance, wash water is first supplied to the shower pipes 22, nearest the rear or discharge end of the channel, and sprayed on the upper surface of the bar passing thereunder. This wash water passes through the bar to the endmost compartment of the suction box 24 and is withdrawn from the end outlet 26 and supplied to the next most rearwardly disposed set of shower pipes 22, as by a suitable pump 26'. From the second set of shower pipes the water passes transversely through the bar and collects in the second compartment 24, is withdrawn therefrom and supplied to the next set of shower pipes in countercurrent succession. It will thus be seen that as the ice bar progresses through the channel, it is successively washed by solutions of greater and greater dilution passing transversely therethrough, and finally by clear wash water. In this manner a very thorough washing is obtained and as the solution washed out by the wash water increases in concentration with each step, the amount of dilution of the recovered solution is not serious.

The ice bar may be advanced through the channel by means of transporting bands, screw conveyors, chains, belts having feeding means, or the like, provided on the bottom and/or the side walls of the channel. The advancing may take place continuously with constant or varying speed, or intermittently as is the case with use of the apparatus shown in Figs. 1 and 2. Here ice sludge is fed into the apparatus and is advanced through the same by means of a piston 30, disposed at the intake end of the channel and closing the latter, said piston being displaceable to and fro in the longitudinal direction of the channel beneath the hopper 16, and being guided by means of guides 32 provided at the bottom of the channel and/or the walls thereof. The pressing piston 30 is provided with openings, said piston being constructed, for example, of wire cloth, a perforated metal plate or the like, secured in a frame which is provided at the top with a rearwardly projecting, non-perforated plate 34, which is adapted to close the intake opening 36 in the roof 18 of the channel during the inward displacement of the piston into the channel. In this embodiment the piston is adapted to be displaced mechanically, for which purpose a rod 40 is pivotally secured to the central portion of the piston, the outer end of said rod being pressed by means of a spring 42 against the peripheral portion of an eccentric 44 which is secured onto a rotating shaft 46.

In Fig. 1, the pressing piston 30 is shown in its open position with full drawn lines and in its closed position with chain-dotted lines. In the first-mentioned position, the space $a$ between the extreme positions of the piston is filled with ice sludge from the hopper 16. When the piston 30 moves inwardly, the intake opening 36 is closed by degrees by the plate 34, the ice sludge being then compressed. Solution escapes through the perforations of the piston and through any perforations in the bottom of the channel, while part of the ice sludge is forced back into the hopper 16. The piston 30 having moved by the distance $b$, the intake opening 36 is entirely closed. During the continued inward movement of the piston by the distance $c$, the ice bar will be forced forwardly by a corresponding distance, solution still escaping through the perforations of the piston. The ratio $b:c$ should be suitably adapted according to the size of the ice crystals, the viscosity of the solution and other factors, and may be varied, for instance by the provision of plates 48 of different widths along the rear edge of the intake opening. This ratio may of course also be altered in some other manner, for instance by varying the eccentricity of the eccentric 44. To prevent any ice crystals added to the end of the ice bar on the forward stroke of the piston 30 from slipping down from the end face of the ice bar when the piston 30 is retracted, the latter is preferably made forwardly slanting when viewed in the direction of advancement. According as the ice bar is advanced and washed by means of liquid supplied through the spraying pipes 22, the same is subjected to a reduction of its volume. In order then to prevent the formation of cracks in the side walls 14, the latter are preferably made slanting outwardly, the ice bar then diminishing more and more in the vertical direction only while the wedge shape thereof is being maintained.

To make it possible to control the pressure, by which the ice bar is compressed and advanced, it may be found suitable to provide the channel with one or more braking members adapted to engage the bar. It has been established by trials that the pressure on the ice bar should be kept within the limits 0.02 and 1.5, preferably between 0.05 and 0.8 kilogram per square centimetre, a common rule being: the higher the concentration of the solution, the higher the pressure. In the embodiment shown, there is arranged a shaft 50 mounted in brackets 52 secured on the side walls 14 for the control of the pressure in the rear part of the channel, said shaft having a plurality of arms 54 secured thereon, which are formed at their outer ends into claws 56 or similar scraping members. The pressure of the claws 56 on the ice bar may be altered by means of weights 58 adapted to be displaced along the arms.

The removal of the ice from the channel may be facilitated by means of a device arranged at the discharge end of the channel, said device consisting, according to the drawing, of a number of scrapers 60 secured on a rotating shaft 62 mounted in the side walls 14.

In the embodiment shown in Fig. 7, the pressing piston 30 represented in Fig. 1 is arranged to be operated hydraulically. To this end, there is arranged a piston 82 movable within a cylinder 80 and having the piston rod 40 secured thereto. Fluid under pressure, from a suitable source, not shown, for operating the piston 82 is supplied through the conduit 81, which is branched over a reversing valve 83 into conduits 84 and 86 controlled by valves 85 and 87 respectively, said conduits opening into the spaces on both sides of the piston 82. The fluid under pressure escapes through conduits 88 and 90, which are controlled by a common reversing valve 91. The valves 85 and 87 are adjustable severally, so that the speed of the piston 82 in both directions may be controlled, it being desirable that the movement of the piston 82 in a direction toward advancement and compression of the ice bar take place comparatively slowly, whereas its movement in the opposite direction should take place as rapidly as possible. Consequently, the valve 85 should thus be adjusted for a restriction greater than that of the valve 87. The reversing valves 83, 91 may be adjusted manually, or they may be arranged to be shifted automatically in a manner known per se.

Fig. 7 also illustrates an automatic arrangement for the braking of the ice bar, the braking members or claws 56 being under the control of the fluid actuating the pressure piston 82. To this end, there is arranged a cylinder 92 with a piston 94 below the arms 54, the piston rod 96 of said piston being arranged to cooperate with the arms 54 to raise the claws 56 out of engagement with the ice bar. A spring 97 tends to move the piston downwardly. The space beneath the piston communicates, through a conduit 98, with that space of the pressure cylinder 80 where the pressure causes the inward movement of the piston 82 and the pressing piston 30. When the pressure is then caused to reach a certain value, for instance shortly after the pressing piston 30 has closed the intake opening 36, such pressure overcomes the power of the spring 97, the piston 94 being then forced upwardly and the piston 96 raising the claws 56 out of engagement with the ice bar into the position shown in Fig. 7.

In all of the embodiments hitherto described, the bottom of the channel is rigid, the same being formed, for instance, of longitudinal ribs separated from one another by intervening spaces. It has been found that difficulties may sometimes present themselves in connection with the advancement of the ice bar by means of the reciprocating piston for the reason that, in order to provide for effective washing, the channel must be of a comparatively great length, 5 to 15 metres, very high pressures of the piston being required to advance an ice bar of this length by means of the piston, which pressures, in turn, necessitate powerful driving means while also causing the ice bar to become so hardly compressed, that the perviousness of the same is reduced, so that the washing effect per unit of length will be impaired.

To provide a remedy for these inconveniences inherent in the embodiments hitherto described, the bottom of the channel may be made movable for the whole or a portion of its length according to the form of embodiment disclosed in Fig. 8. By this arrangement the friction of the ice bar against the bottom of the channel is reduced, so that the piston pressure may be kept within reasonable limits, for instance between 0.1 and 0.3 or somewhat above 0.3 kilogram per square centimetre.

According to this latter construction, the bottom of the channel, extending from the intake end thereof, preferably consists of a rigid portion and beyond the same is a movable portion, the latter being preferably constituted by freely rotatable members disposed transversely of the channel, such members consisting, for instance, of freely rotating rollers carrying one or more belts running thereabout.

According to Fig. 8, the bottom of the channel 10, regarded from the intake end thereof, consists of a rigid front portion $12^1$ and a movable rear portion $12^2$. The rigid portion $12^1$ may, as in the previously described embodiments, consist of a grate of longitudinal spaced iron bars, for example, while the movable portion may be constituted by one or more endless belts 100 running over two rollers 102, arranged crosswise of the channel, and guided by guide rollers 104, which are likewise arranged transversely of the channel. The belt or belts, which may be perforated, may be of such a width that only a portion of the width of the bottom is covered thereby, for instance in a manner such that a plurality of belts running in parallel are arranged with spaces therebetween. By this arrangement, a readily effected escape of the solution will be obtained.

The ice bar is advanced by the piston 30 as hereinbefore described, preferably in the manner described with reference to Fig. 7, the piston 30 then sliding on the rigid bottom portion $12^1$ and being then advanced on the movable bottom portion 12² without any sliding movement thereon. The resistance to the advancement to be overcome by the hydraulic driving means 80, 82 is thus made up by the sliding friction against the rigid bottom 12¹ and the rolling friction within the rolling track 12², so that the pressure which is required to be exerted by the piston 30 will be considerably less than if the whole bottom were rigid. The rigid bottom portion may constitute ½ to ⅒ and the movable bottom portion thus ½ to ⁹⁄₁₀ of the length of the channel. Spraying pipes 22 for the supply of washing liquid, generally water, are preferably arranged both over the rigid and the movable bottom portions.

To bring about a solid surface on the ice bar, particularly the lower side thereof, there may be provided some suitable device within the channel for the flattening or compression of the bar. According to the embodiment shown, a plate or lip 106 or the like extending in the transverse direction of the bottom is arranged between the rigid portion and the movable portion of the channel, said plate forming an acute angle with the bottom, counted in the direction of advancement. By this arrangement, the sliding of the ice bar onto the movable bottom portion is facilitated. The plate may extend over the whole width of the bottom, or, such plates may be arranged only over a portion of the width of the bottom, for instance at the edges of the channel. It may also be found suitable to effect such flattening or jamming of the upper portion of the ice bar as well, for instance along the upper lateral edges thereof, whereby any fissures formed in the bar will be closed for the benefit of efficient washing.

Instead of being freely movable, the movable portion or roller track 12² may be driven positively. By reason of the intermittent feeding of the ice bar by means of the piston 30, and particularly in consequence of the fact that the distance of advancement is not constant for every piston stroke, but is dependent on the quantity of ice mixture supplied, the driving means for the movable portion must then operate intermittently and under the control of the feeding, as otherwise the risk is incurred that the ice bar might break, which would entail inefficient washing. In most cases, however, it is preferred to have the movable portion freely movable.

The invention is applicable in all such cases where the separation of solution from snow or ice crystals formed by freezing out of the same is considered. For example, the invention may be applied in producing salt out of sea-water, in the concentration of sulphite waste lye to separate solid substances therefrom, and so forth.

The invention is of course not limited to the embodiments disclosed in the drawing, but may be subjected to modifications in many respects, without the scope of the invention being exceeded thereby. For the displacement of the pressing piston, every other known contrivance may of course be brought into use, such as a crank movement. Also, the movable bottom portion of the channel disclosed in the last described embodiment may, for instance, consist of rollers only, which should then be arranged in close propinquity to each other. In place of belts it is of course possible to employ chains or other endless elements.

It is obvious that the invention is not limited to the embodiments shown in the drawing since these may be modified in several respects without departing from the scope of the invention.

For the displacement of the pressing piston, any other known suitable device may be used, for instance a crank device. The bottom of the apparatus may be inclined with respect to the horizontal plane. The inclination, however, must not be so pronounced as to cause the ice bar to move through the apparatus solely by its own weight.

The technical effect obtained by the invention will be more fully explained in the following. Ice sludge has greater capacity to absorb solution than have salt crystals. This physical property of the ice sludge is the cause of a plurality of inconveniences which do not exist with respect to salt crystals. These inconveniences which are eliminated according to the present invention are as follows:

(a) Without a special compression it is difficult to recover a solution from an ice sludge, and in any case it is considerably more difficult than to recover solution from salt crystals.

(b) When recovering solution from ice sludge by washing with a more diluted solution the volume of the ice mass shrinks very considerably. This is due to the fact that the quantity of solution which is absorbed by the ice crystals is greater, the higher the concentration of the solution. Consequently, a powerful shrinking takes place when washing such ice sludge if a compression is not simultaneously effected, which compression brings about the formation of fissures. Such formation of fissures must be avoided, since otherwise no washing can be effected without considerable manual work. For this reason the washing of the ice sludge takes place while simultaneously compressing the same.

This compression must, however, in order to remove the solution as far as possible, be effected by compressing the ice in rather thin layers. The final result is that the best solution of this problem is to compress the ice sludge in rather thin layers and simultaneously to advance the ice bar continuously by a pressure applied as above described.

In summing up, the technical effect resides in the fact that, in contradistinction to prior methods, the solution is pressed off before washing is effected. By compressing according to the present invention, the material will be acted on during the compression in relatively thin layers whereby the greatest possible pressing out is obtained.

To advance a bar of crystals, for instance salts, continuously, in various ways, and to wash the crystal bar during this advancement was previously known. However, combining the washing with pressure in the manner described is entirely novel.

What I claim is:

1. Apparatus for separating solution from a mixture of solution and ice or snow crystals produced by freezing water out of a solution of a substance in water, comprising a substantially horizontal channel having a perforated bottom, the perforations having a smaller passage area at the intake end of the channel than along the main portion thereof, means for supplying a mixture of solution and ice or snow crystals at the intake end of said channel, means for intermittently applying pressure to the mixture to compress the same to form a continuous bar of ice and positively to advance the bar longitudinally through the channel, means for supplying washing liquid for passage of the same transversely through the bar at substantially right angles thereto during its advancement and means for removing the escaping solution.

2. Apparatus for separating solution from a mixture of solution and ice or snow crystals produced by freezing water out of a solution of a substance in water, comprising a substantially horizontal channel having a bottom formed by longitudinal spaced bars or ribs, the spaces between said bars or ribs being narrower at the intake end than along the main portion of the channel, means for supplying a mixture of solution and ice or snow crystals at the intake end of said channel, means for intermittently applying pressure to the mixture to compress the same to form a continuous bar of ice and positively to advance the bar longitudinally through the channel, means for supplying washing liquid for passage of the same transversely through the bar at substantially right angles thereto during its advancement and means for removing the escaping solution.

ERIK ÖMAN.